(12) United States Patent
Leighton et al.

(10) Patent No.: US 11,427,110 B2
(45) Date of Patent: Aug. 30, 2022

(54) PIVOT FITTING FOR A SEAT, IN PARTICULAR VEHICLE SEAT AND A SEAT

(71) Applicant: ADIENT ENGINEERING AND IP GMBH, Burscheid (DE)

(72) Inventors: Michael J. Leighton, Lasalle (CA); Kenneth R. Ptak, South Lyon, MI (US)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 10 days.

(21) Appl. No.: 17/052,228

(22) PCT Filed: Apr. 30, 2019

(86) PCT No.: PCT/EP2019/061053
§ 371 (c)(1),
(2) Date: Nov. 2, 2020

(87) PCT Pub. No.: WO2019/211275
PCT Pub. Date: Nov. 7, 2019

(65) Prior Publication Data
US 2022/0009382 A1     Jan. 13, 2022

Related U.S. Application Data

(60) Provisional application No. 62/666,717, filed on May 4, 2018.

(51) Int. Cl.
*B60N 2/02* (2006.01)
*B60N 2/90* (2018.01)
(Continued)

(52) U.S. Cl.
CPC ........... *B60N 2/0244* (2013.01); *B60N 2/206* (2013.01); *B60N 2/22* (2013.01); *B60N 2/90* (2018.02);
(Continued)

(58) Field of Classification Search
CPC .............................................. B60N 2002/0272
See application file for complete search history.

(56) References Cited

U.S. PATENT DOCUMENTS 10,232,740 B1 * 3/2019 Jaradi .................. B60N 2/0232
10,358,053 B2 7/2019 Uno et al.
(Continued)

FOREIGN PATENT DOCUMENTS

DE           10145746 A1 * 4/2003 ............... B60N 2/22
DE     102006039504 A1     2/2008
(Continued)

OTHER PUBLICATIONS

European Patent Office, International Search Report with Written Opinion, issued in PCT/EP2019/061053 dated Jul. 4, 2019, 9 pages, European Patent Office, Rijswijk, Netherlands.

*Primary Examiner* — Timothy J Brindley
(74) *Attorney, Agent, or Firm* — Marshall & Melhorn, LLC

(57) ABSTRACT

A pivot fitting for a seat, in particular vehicle seat, is configured to adjust an inclination of the seat between at least a use position and at least a non-use position. The pivot fitting may have at least one detection unit which is configured to determine if the seat is in at least one of the use position, any intermediate inclined position or the non-use position.

16 Claims, 6 Drawing Sheets

(51) Int. Cl.
  *B60N 2/20*  (2006.01)
  *B60N 2/22*  (2006.01)
(52) U.S. Cl.
  CPC ............. *B60N 2002/0272* (2013.01); *B60N 2002/981* (2018.02)

(56) References Cited

U.S. PATENT DOCUMENTS

| | | | | |
|---|---|---|---|---|
| 2013/0278036 | A1* | 10/2013 | Worden | B60N 2/067 297/362.11 |
| 2014/0054944 | A1* | 2/2014 | Locke | B60N 2/853 297/354.13 |
| 2017/0210246 | A1* | 7/2017 | Kubota | B60N 2/0232 |
| 2019/0259171 | A1* | 8/2019 | Ueno | B64D 45/00 |
| 2019/0299814 | A1* | 10/2019 | Yetukuri | B60N 2/002 |
| 2019/0359089 | A1* | 11/2019 | Duriez | B60N 2/02 |
| 2020/0139853 | A1* | 5/2020 | Nawrocki | B60N 2/16 |
| 2020/0156506 | A1* | 5/2020 | Goto | B60N 2/18 |
| 2020/0189419 | A1* | 6/2020 | Lee | B60N 2/06 |
| 2020/0262326 | A1* | 8/2020 | Honda | B60N 2/3065 |
| 2020/0346607 | A1* | 11/2020 | Kim | B60N 2/002 |
| 2021/0138934 | A1* | 5/2021 | Lee | B60N 2/12 |

FOREIGN PATENT DOCUMENTS

| | | | | | |
|---|---|---|---|---|---|
| DE | 102016008072 A1 | * | 1/2018 | ........... | B60N 2/0252 |
| DE | 102019124458 A1 | * | 3/2021 | ........... | B60N 2/2893 |
| EP | 3693209 A1 | * | 8/2020 | ........... | B60N 2/0244 |
| WO | WO-2018008508 A1 | * | 1/2018 | ........... | B60N 2/0248 |

\* cited by examiner

PIVOT FITTING FOR A SEAT, IN PARTICULAR VEHICLE SEAT AND A SEAT

BACKGROUND OF THE DISCLOSURE

The present disclosure relates generally to a pivot fitting for a seat, in particular vehicle seat, and a seat having such a pivot fitting.

In the prior art, various seat adjusters with fittings for manual or electrically operated adjustment of a backrest of a vehicle seat are known, for example, for easy-entry systems or folding of the backrest to increase a vehicle tail load space.

SUMMARY OF THE DISCLOSURE

It is an object of the present disclosure to provide an improved pivot fitting for a seat, in particular vehicle seat, for adjusting at least a backrest of the seat and a seat, in particular vehicle seat, having an improved pivot fitting.

The object is achieved according to the invention with respect to the pivot fitting by the features claimed in claim 1. With regard to the seat, in particular vehicle seat, the object is achieved according to the invention by the features claimed in claim 11.

According to the disclosure, the pivot fitting for a seat, in particular vehicle seat is configured to adjust an inclination of the seat between at least a use position and at least a non-use position. The pivot fitting represents two fitting members, wherein one of the fitting members is fixed and the other fitting element is moveable with respect to the fixed one. The pivot fitting can be referred to as a seat back locking device, a pivot lock, a discontinuous locking pivot or as a discrete position locking device.

The pivot fitting comprises at least one detection unit which is configured to determine if the seat is in at least one of the use position, any intermediate inclined position or the non-use position. For example, the detection unit can be configured to determine an inclination angle of the seat, particularly of a backrest of the seat relative to another seat part, which is fixed. Further, adjustment of inclination of the seat is understood as an adjustment of inclination of a seat part relative to the other seat part. The pivot fitting is exemplarily a recliner of the seat. Particularly, the seat comprises a seat pan and the backrest, wherein the backrest is movable relatively to the seat pan.

In particular, in the use position of the seat, an occupant can sit on the seat. In the non-use position of the seat, the seat is stowed such that a load space, particularly load compartment, cargo space or cargo area, is increased. Therefore, at least the backrest can be folded down towards the seat pan and the vehicle floor to be stowed in this folded position.

For instance, the pivot fitting is actuated by a release mechanism, whereas the adjustment of the inclination is initiated. Thereby, a user of the vehicle can actuate an actuating element, such as a button or any other operating element, which is exemplarily arranged in a tailgate area, a rear hatch of the vehicle or in a dashboard area.

The present invention relates to an improved pivot fitting, wherein when some or all of the seats have not reached the non-use position, when desired by the occupant, the detection unit is configured to determine that there might be or is an obstacle in a travel way. Thereby, when the backrest has not reached a fully folded, substantially horizontal position, the detection unit can detect and identify a current state of the backrest. In particular, a problem which occurs when an obstacle, for example a child seat or any other forgotten item positioned on the seat is present, can be prevented by the present invention. Moreover, with an obstacle in the way, the seat may move to a position between locked states and unlocked states reducing the pivot fittings structural strength. According to the present invention relating to the improved pivot fitting, such a reduction of the pivot fittings structural strength can be prevented, when the state of the seat is detected early enough. Particularly, the seat will not run against the obstacle for a long duration. Thereby, even a bending and damaging of the obstacle itself can be avoided. As soon as the detection unit determines that the seat is in an intermediate inclined position and is not reaching the fully stowed, non-use position, the user will be notified in time.

Determining if the seat is in an intermediate inclined position means that it will be determined if the seat, in particular the backrest is released. This requires much less precision than determining if the seat, in particular the backrest is locked.

According to a further embodiment, the detection unit is configured to determine an actuation of the inclination adjustment and the intermediate inclined position for an unusual duration time. When those output signals are detected, the user will be notified.

According to another possible embodiment, the detection unit is configured to determine if the seat, particularly the backrest, is at least in one of a fully locked state, a partial locked state or an unlocked state when inclination adjustment of the seat, particularly the backrest, is actuated. Particularly, the detection unit is configured to identify if the seat is at least in one of the use position, any intermediate inclined position or the non-use position.

According to a further possible embodiment, the detection unit is configured to output a signal if the seat is, for instance got stuck in the intermediate inclined position. The intermediate inclined position is understood as any position between the use position and the non-use position into which the seat can be brought.

Another embodiment of the pivot fitting relates to the detection unit comprising a coupling structure which is configured to couple the detection unit to at least one indicator unit. The indicator unit is configured to indicate at least the intermediate inclined position of the seat to the user. In particular, the indicator unit indicates that a state of full release or partial release of the seat, particularly the backrest, has occurred without reaching the non-use, fully stowed position. A presence of an obstacle can be presumed. In particular, the indicator unit indicates that the pivot fitting is still in an unlocked state to the user. Following, the user can react to an indication.

For instance, the indicator unit is configured to indicate the position of the seat audibly and/or visually. In particular, if some or all of the seats have not reached the folded state as desired, this determination of seat condition will be noted to the user that some seats or all seats are in a potential unlocked state. The determination of the seat condition is executed without actually measuring the locked or unlocked state of the pivot fitting. For example, the indicator for the user is achieved through a dashboard light and/or a visual and/or audible indicator element arranged in a front of the vehicle and/or rear and/or tailgate area of the vehicle. Further, the indicator can be indicated to the user through an infotainment system of the vehicle, such as an infotainment screen. For instance, the indicator notifies the user that an identified seat has to be checked for locking. Then the user can remove the potential obstacle so that the seat can be locked in the non-use position, particularly in a fully folded and stowed position.

In another embodiment of the pivot fitting, the detection unit comprises a coupling structure to couple the detection unit to at least one of an electronic control unit. Signals for the lock and/or unlock states of the seat, particularly of the backrest, are transmitted to the electronic control unit to indicate the detected state of the seat. For example, the electronic control unit detects if a release mechanism of the pivot fitting has been activated and wait for a second signal for detecting if a lock and/or unlock mechanism of the pivot fitting has been actuated. The electronic control unit takes a signal from the actuation element which is configured to adjust the inclination of the seat, whereas the control unit turns on the indicator unit, particularly a dashboard indicator, with a delay to account for an inclination speed, particularly folding speed of the seat, particularly of the backrest. After a given delay if no further signal of a reached locked state has been detected, the indicator unit will be turned on to indicate the unlocked state, particularly unlocked condition, of the seat. The user will be notified via visual and/or audible output that the seat is potentially unlocked.

According to a further embodiment, the detection unit is configured to determine a manual actuation of the inclination adjustment. In particular, when the user had been notified by the indicator unit that the seat has not reached the non-use position, particularly the fully folded position, the user is requested to check the identified seat for locking. When the user then manually operates the seat, for example by actuating a release lever and/or a fold flat manual lever of the seat, this manual actuation of the inclination adjustment will be detected by the detection unit. A second signal that the user has intervened folding the seat will turn off the indicator unit, such as a dashboard light. Alternatively or additionally, the indicator unit will output audible and/or visual confirmation that the seat had been manually folded to the non-use position and/or a fully locked state.

In a further possible embodiment of the pivot fitting, the detection unit comprises a number of switches configured to signal transmission to the electronic control unit upon activation, wherein the switches are activated when the seat is in the intermediate inclined position. The switches may be designed as electric switches, such as miniature snap-action switches. A first switch may be attached between an upper half and a lower half of a seat back system. For instance, the first switch is attached between the upper half and the lower half of the pivot fitting at a coupling area of the backrest and the seat pan. The first switch is positioned such that a switch state is changed prior to reaching the non-use position as to manage all potential variation of backrest angles relative to the seat pan, and interference and component manufacturing variation. A second switch may be attached to a handle and/or lever release system for manual actuation of the inclination adjustment of the seat. The second switch is positioned to verify the release system has changed states between locked and unlocked, but not required to compensate for variation between states. A function of the second switch is to reset the system once the user has manually operated the seat.

Moreover, the pivot fitting may have at least one switch sensor coupled to at least one of the number of switches and configured to detect an activation of the switch. The at least one switch sensor may be coupled to a switch contact member, e.g. a roller lever, wherein the switch sensor is configured to detect a contact of the switch contact member by a seat member when the seat is in the intermediate inclined position. For example, the switch contact member is contacted by a release lever of the pivot fitting when the seat is in the intermediate position resulting in a downward movement of the switch contact member. This movement is detectable by the switch sensor.

Generally, rear row seats may be provided with a number of sensors. In particular, each backrest of the rear row seats is provided with a number of sensors. The sensors are configured to detect the position and/or locked and/or unlocked state of the seats, particularly backrests. Signals of the sensors will be transmitted to the indicator unit, for instance via the electronic control unit after evaluating the signals. Exemplarily, the number of sensors is arranged in an area of the backrest coupling a seat pan of the seat to detect a position of the backrest relative to the seat pan and/or a vehicle floor. Second sensors are configured to detect the manual actuation of the seat inclination adjustment. By manually actuating the release lever and/or fold flat manual lever and/or an actuation wheel, such as a handwheel, on the seat, the sensors will transmit a signal that the user has intervened. In particular, these sensors determine signals that a manual release system of the seat has been activated which requires less precision than conventional measuring of the locked and unlocked states.

According to another embodiment, the seat unlocked state is defined by a two-flag system. One flag element is arranged between the backrest, i.e. seatback, and the seat pan, i.e. seat cushion. Alternatively or additionally, the flag element is arranged between an upper and a lower half of the pivot fitting, particularly in form of a recliner of the seat. The flag element is configured to identify if the seat has not folded flat. Additionally or optionally, the position of the seat can be identified through tip point such as for tip and slide mechanism. Another flag element is attached to a release system, particularly to a recliner/pivot fitting release mechanism to signal that the user has verified the seat is locked by manual actuating the inclination adjustment.

The disclosure further relates to a seat, in particular vehicle seat, comprising a seat pan, a backrest which is pivotably mounted to the seat pan, and a pivot fitting for adjusting an inclination of the backrest relatively to the seat pan between at least a use position and at least a non-use position.

According to an exemplary embodiment, the pivot fitting comprises at least two fitting members configured to interact with each other. One fitting member is arranged at a backrest side which is coupled to the seat pan and another fitting member is arranged at a seat pan side coupled to the backrest side.

In a further exemplary embodiment, at least one of the fitting members is coupled to an actuation element which is configured to electrically and/or mechanically actuate the inclination adjustment of the backrest. For instance, the actuation element is an actuation button to be operated by the user.

In a possible further embodiment, the pivot fitting is configured as an electric-powered adjustable fitting. Particularly, a motor is provided by the seat to electrically actuate the pivot fitting, exemplarily for automated inclination adjustment. For example, the seat uses a parallel drive unit, wherein on one side a discontinuous recliner with discrete locking positions is arranged and on the other side the motor and/or a transmission is arranged.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION OF PREFERRED EMBODIMENTS

Figure 1:
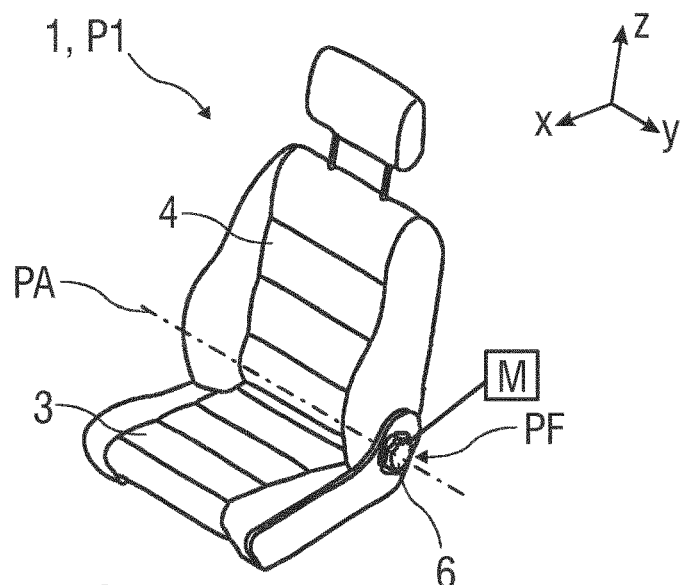
FIG. 1 shows a perspective view of an embodiment of a seat, in particular vehicle seat.

FIG. 1 shows a perspective view of an embodiment of a seat 1, in particular vehicle seat.

Figure 2:
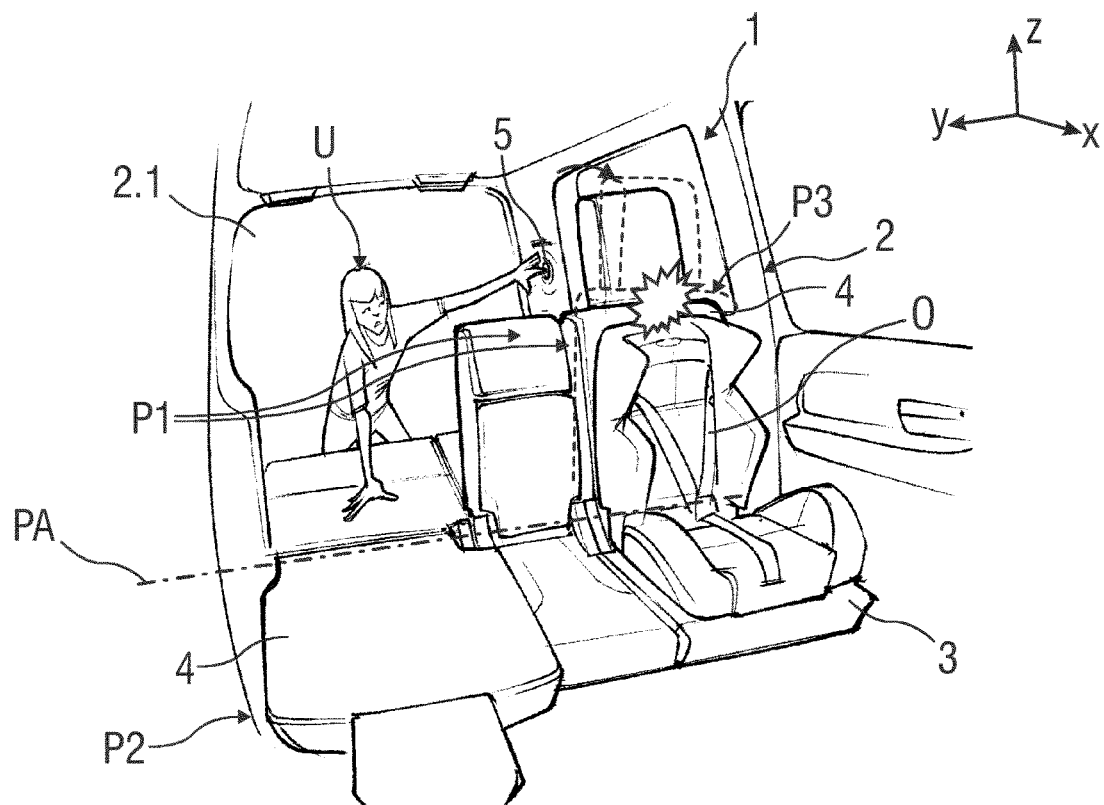
FIG. 2 shows a perspective view of an embodiment of vehicle seats.

FIG. 2 shows a perspective view of an embodiment of seats 1, in particular vehicle rear row seats.

For a better understanding of subsequent descriptions of the seat 1 a coordinate system is shown in further figures. The coordinate system comprises a longitudinal axis x, a transverse axis y and a vertical axis z in relation to a vehicle 2.

The seat 1 comprises a seat pan 3 and a backrest 4. The backrest 4 is adjustable relatively to the seat pan 3. In particular, the backrest 4 is pivotably connected to the seat pan 3 by at least one of a backrest pivot fitting PF in a backrest pivot axis PA. For instance, the pivot fitting PF is provided by a recliner mechanism and thereby comprising recliner fittings.

The seat 1 is adjustable between a use position P1 and a non-use position P2. The use position P1 provides a seating to a user U. The non-use position P2 is a position in which the backrest 4 is folded down providing a flat, horizontal surface. Particularly, the backrest 4 is folded down towards the seat pan 3, as shown in FIG. 2.

The pivot fitting PF is configured to adjust an inclination of the seat 1, particularly of the backrest 4, between the use position P1 and the non-use position P2. The pivot fitting PF is exemplarily configured as an electric-powered continuously adjustable fitting. To actuate the inclination adjustment of the backrest 4, an actuation element 5 is provided within the vehicle 2. For example, the actuation element 5 is arranged in a rear region 2.1 of the vehicle 2 as shown in FIG. 2. Alternatively or in addition, there may be an actuation element 5 arranged in a front area of the vehicle 2, e.g. a center console. The actuation element 5 is a button or switch which can be operated by the user U. Exemplarily, when the user U operates the actuation element 5 to fold the backrest 4, a motor M or a solenoid cable (not shown) can be actuated to open a latching mechanism of the backrest 4, whereas a spring device moves the backrest 4 automatically to the non-use position P2, such as a folded condition.

When an obstacle O, e.g. a child seat, is positioned on the seat pan 3, the backrest 4 cannot reach the non-use position P2. The inclination of the backrest 4 will be blocked by the obstacle O, as schematic shown in FIG. 2. This blocked position of the backrest 4 will be further described as an intermediate position P3. The intermediate position P3 is any position between the use position P1 and the non-use position P2, wherein the backrest 4 is unlocked to be adjusted in inclination but not have reached the non-use position P2.

To avoid damaging of the obstacle O and the pivot fitting PF, the pivot fitting PF comprises a detection unit 6 which is configured to determine if the seat 1 is in at least one of the use position P1, the intermediate position P3 or the non-use position P2. In particular, the detection unit 6 is configured to output a signal if the seat 1 is in the intermediate position P3, such as an intermediate inclined position of the seat 1.

Figure 3:
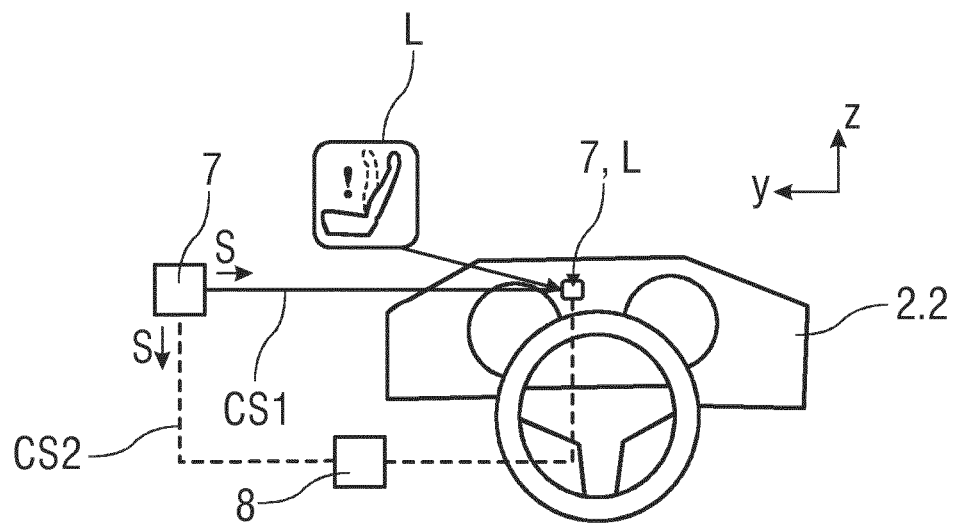
FIG. 3 shows a schematic front view of an embodiment of a dashboard of a vehicle.

FIG. 3 shows a schematic front view of an embodiment of a dashboard 2.2 of the vehicle 2. In particular, the detection unit 6 comprises a coupling structure CS1 configured to couple the detection unit 6 to at least one indicator unit 7 to indicate that the seat 1 has not reached the non-use position P2. The coupling structure CS1 may be configured as a connecting wire and/or a data bus line. Particularly, the indicator unit 7 is configured to indicate that the seat 1 is in the intermediate position P3. For instance, the indicator unit 7 is positioned in a region of the dashboard 2.2 such that when the user U is seated on a driver's seat, the user U will be visually notified to check the identified backrest 4. For example, the indicator unit 7 may be separately mounted on the dashboard 2.2. Exemplarily, the indicator unit 7 comprises an indicator light L (shown by the enlarged section) arranged in the region of the dashboard 2.2. Additionally or optionally, the indicator unit 7 is configured to output audible information to the user U. The indicator unit 7 may be also integrated into a vehicle infotainment system, whereby the indicator light L and/or the audible signal is indicated in a display panel of the infotainment system.

In another embodiment, the detection unit 6 of the seat 1, which can be adjusted from the use position P1 to the non-use position P2, comprises a further coupling structure CS2 configured to couple the detection unit 6 to an electronic control unit 8 (short known as ECU). The further coupling structure CS2 may be configured as a connecting wire and/or a data bus line. The electronic control unit 8 takes signals from the detection unit 6 and/or the actuation element 5 to turn on or off the indicator unit 7 (shown with dotted straight line). The detection unit 6 may be also coupled to the electronic control unit 8 via the indicator unit 7. In this case, the further coupling structure CS2 is arranged between the indicator unit 7 and the electronic control unit 8.

Figure 4A:
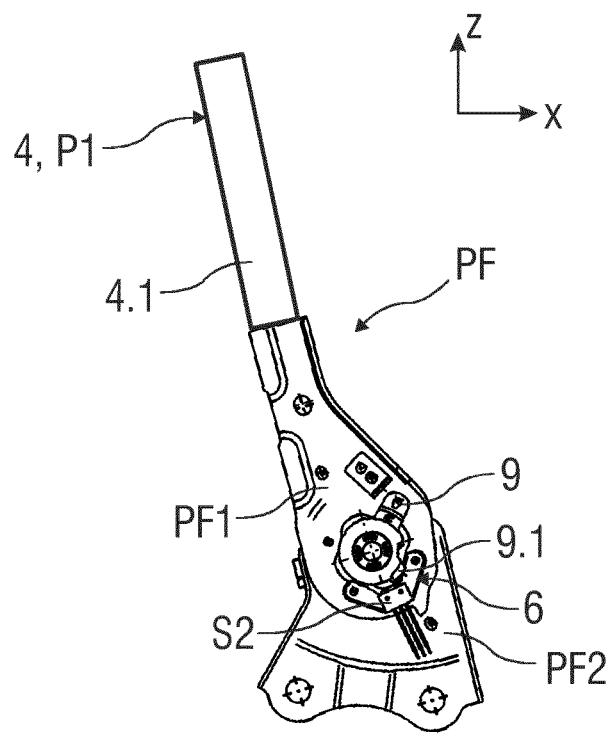
FIGS. 4A and 4B show a side view of an embodiment of a pivot fitting of the seat.
Figure 4B:
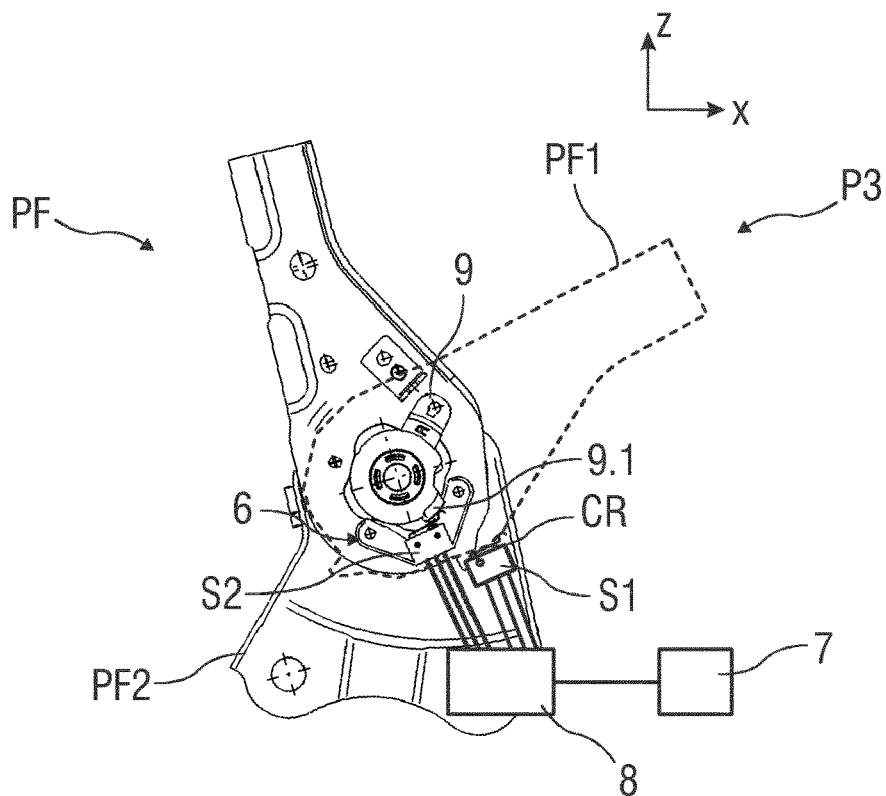

FIGS. 4A and 4B show a side view of a possible embodiment of the pivot fitting PF of the seat 1. Thereby, FIG. 4A shows the backrest 4 in the use position P1, particularly in an upright position and FIG. 4B shows the backrest 4 in the intermediate position P3.

The pivot fitting PF comprises two fitting members PF1, PF2 which are configured to interact with each other when the inclination of the backrest 4 is adjusted. For example, a first (upper) fitting member PF1 is coupled to the backrest 4. A second (lower) fitting member PF2 is coupled to the seat pan 3 and/or to a vehicle structure, such as a vehicle floor structure.

Further, the pivot fitting PF comprises a release lever 9 which can be actuated for inclination adjustment of the backrest 4. The release lever 9 may be pivotally coupled to the recliner mechanism. Furthermore, the detection unit 6 is arranged between an upper half and a lower half of the pivot fitting PF, particularly arranged in a region between the fitting members PF1, PF2.

According to a further embodiment, the detection unit 6 can be arranged within a small space between the pivot fitting PF and a backrest frame 4.1 of the backrest 4.

The detection unit 6 comprises a number of switches S1, S2, in particular electric switches, for signal transmission to the electronic control unit 8 for position determination of the backrest 4. For instance, the detection unit 6 comprises a switch S1, such as a miniature snap-action switch and/or comprising of a tipping-point mechanism, which is arranged in an upper section of the lower fitting member PF2. The switch S1 interacts with the upper fitting member PF1. Exemplarily, the switches S1, S2 can be arranged on a not further shown inner side of the fitting members PF1, PF2.

When the backrest 4 is actuated for inclination, the fitting member PF1 is adjusted to fold substantially downward. In the use position P1, the switch S1 is not activated, that means e.g. that the fitting member PF1 is not in contact with the switch S1 to change its state. In the non-use position P2, the switch S1 is not activated as well. When the backrest 4 moves from the use position P1 to the non-use position P2 the switch S1 will be activated through a contact region CR of the fitting member PF1.

Especially, when the backrest 4 get stuck in the intermediate position P3 due to the obstacle O preventing the backrest 4 from folding fully down, the switch S1 is activated transmitting a signal S to the electronic control unit 8 via the coupling structure CS1 and/or the further coupling structure CS2. The intermediate position P3 will be determined after a delay of time and signaled via the indicator unit 7 to the user U, in particular by the indicator light L and/or by an audible signal.

Moreover, the detection unit 6 comprises a further switch S2 arranged in a lower section of the backrest fitting member PF1. The switch S2 is configured to interact with a seat member 9.1, in particular a projection 9.1 of the release lever 9. When the indicator unit 7 indicates that the backrest 4 is in the intermediate position P3, the user U is asked to manually adjust inclination of the backrest 4, for example after removing the obstacle O. The user U can operate the release lever 9 to adjust the backrest 4 manually. Therefore, the release lever 9 facilitates access in and/or on the seat 1. In particular, while the backrest 4 is in the intermediate position P3, the switch S2 is activated signaling that the backrest 4 is not locked in the non-use position P2. In particular, the projection 9.1 comes in contact with the switch S2. As soon as the user U fully folds down the backrest 4 to its non-use position P2, the release lever 9 will be locked. Thereby, the projection 9.1 is configured to overrun the electric switch S2. Without contacting the switch S2, the electronic control unit 8 will evaluate non-signals to turn off the indicator unit 7.

Figure 5A:
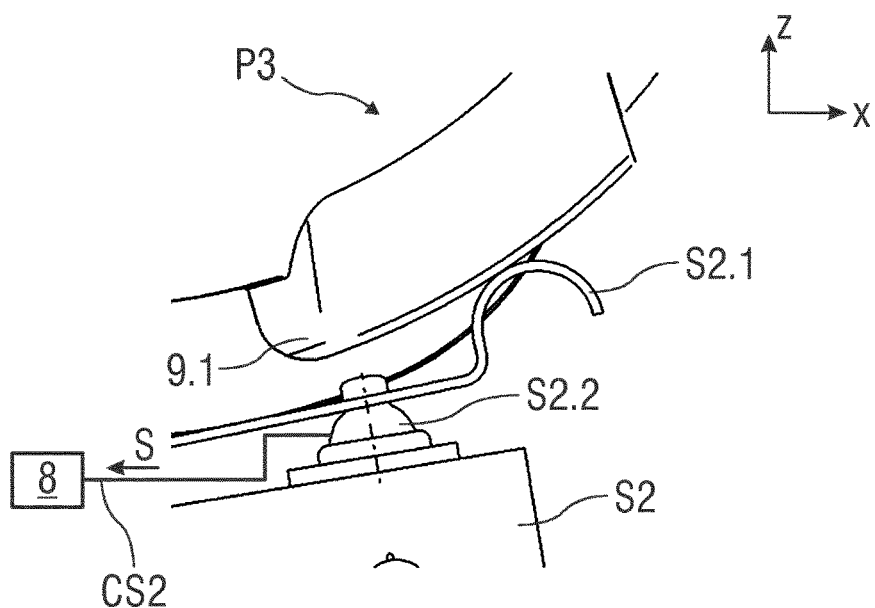
FIGS. 5A and 5B show a side view of an embodiment of the seat.
Figure 5B:
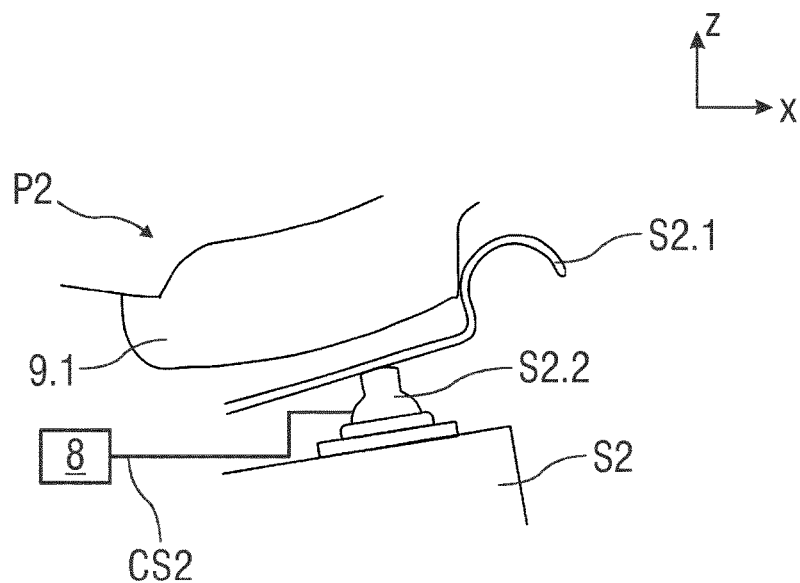

FIGS. 5A and 5B show a side view of an embodiment of the seat 1. Particularly, FIG. 5A shows a determined intermediate position P3 of the seat 1, wherein the projection 9.1 of the release lever 9 is in contact with a switch contact member S2.1 of the switch S2. The switch contact member S2.1 is configured as a roller lever or a flat spring that can be pressed down by the projection 9.1 of the release lever 9 when the seat 1 is in the intermediate position P3. This movement can be detected by a switch sensor S2.2, which will be consequently activated and transmits a signal to the electronic control unit 8 via the further coupling structure CS2. In particular, if the switch contact member S2.1 is pressed downwards it will provide sufficient force to compress another spring element inside the switch S2. Consequently, electrical contacts inside the switch S2 will begin to move towards or away from each other. If the electrical contacts are closed or opened (dependent on the configuration of the switch S2), the switch sensor S2.2 may generate the signal and transmit this signal to the electronic control unit 8 via the further coupling structure CS2.

Further, FIG. 5B shows a determined non-use position P2 of the seat 1, wherein the projection 9.1 overran the switch contact member S2.1 so that the switch contact member S2.1 is not further activating the switch sensor S2.2. Thereby, the projection 9.1 and so as the release lever 9 are locked in this position.

Figure 6:
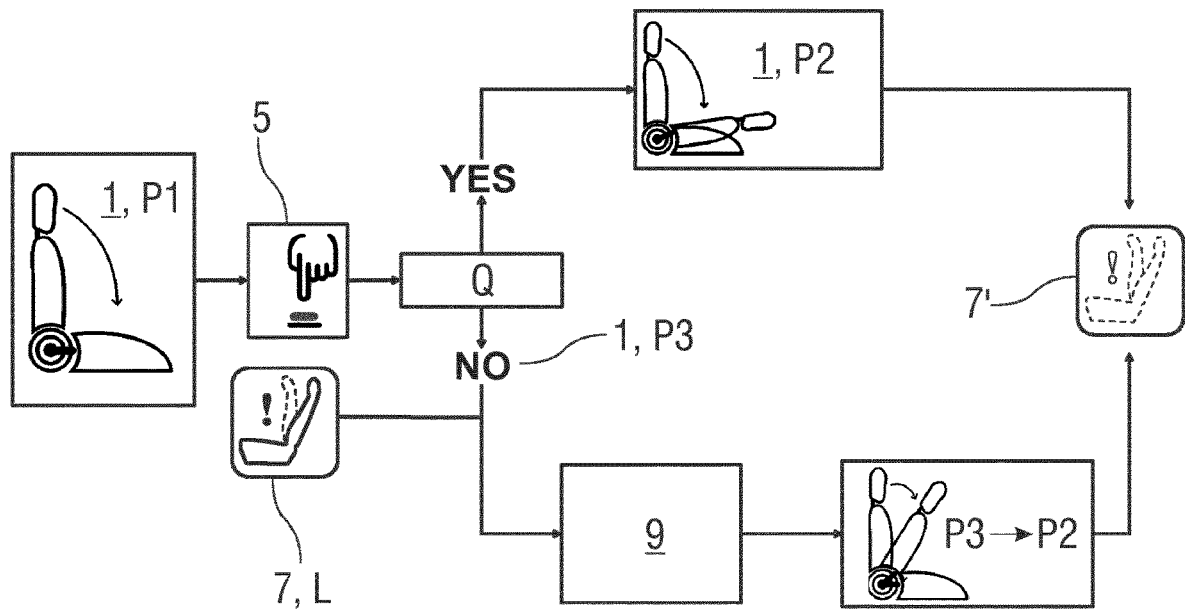
FIG. 6 shows a schematic view of a process for detection of a seat position.

FIG. 6 shows a schematic view of a process for detection of a seat position P1 to P3. In particular, the shown process comprises two-flag logic. Exemplarily, the logic/algorithm, exemplarily using a code with a two-symbol system, compares different switch states of the switches S1, S2 depending on a state of the actuation element 5.

In the use-position P1 of the seat 1, particularly of the backrest 4, a normal use condition switch state will be determined, whereas the actuation element 5 has not been activated. When the user U has operated the actuation element 5, a query Q is started to determine if all of the seats 1, particularly backrests 4, has reached the non-use position P2, particularly a fully folded flat condition. Thereby, different switch states will be checked. If the seat 1 has reached the non-use position P2, a switch state will be determined with matching data. The indicator unit 7 stays turned off, in FIG. 6 shown as turned off indicator unit 7'. If the seat 1 has not reached the non-use position P2 within a delay of time, whereas an actuation state of the actuation element 5 and at least the backrest switch S1 remains over the delay of time, the indicator unit 7 will be turned on using e.g. the indicator light L and/or an audible signal. While the backrest 4 is in the intermediate position P3, the switch S2 is activated signaling that the backrest 4 is not locked in the non-use position P2. The indicator unit 7 will stay turned on till the user U operates the release lever 9 manually. As soon as the user U fully folds down the backrest 4 to its non-use position P2, the release lever 9 will be locked. Without contacting the switch S2, the electronic control unit 8 will evaluate non-signals to turn off the indicator unit 7. Consequently, a detected operation of the release lever 9 will reset the switch states. The indicator unit 7 will be turned off, shown in FIG. 6 as turned off indicator unit 7'.

Figure 7A:
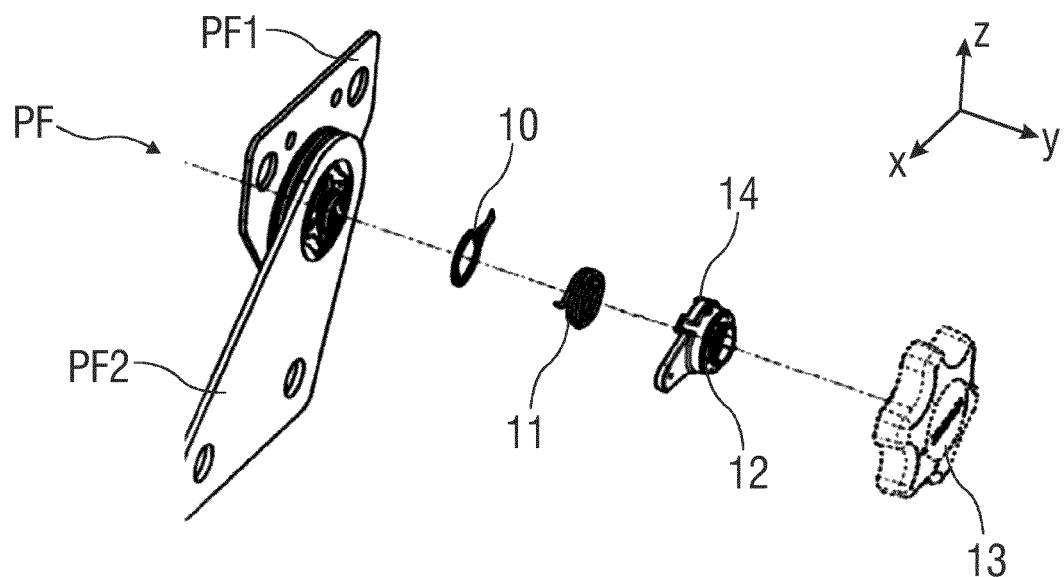
FIGS. 7A to 7C show an exploded view and side views of an embodiment of the pivot fitting.
Figure 7B:
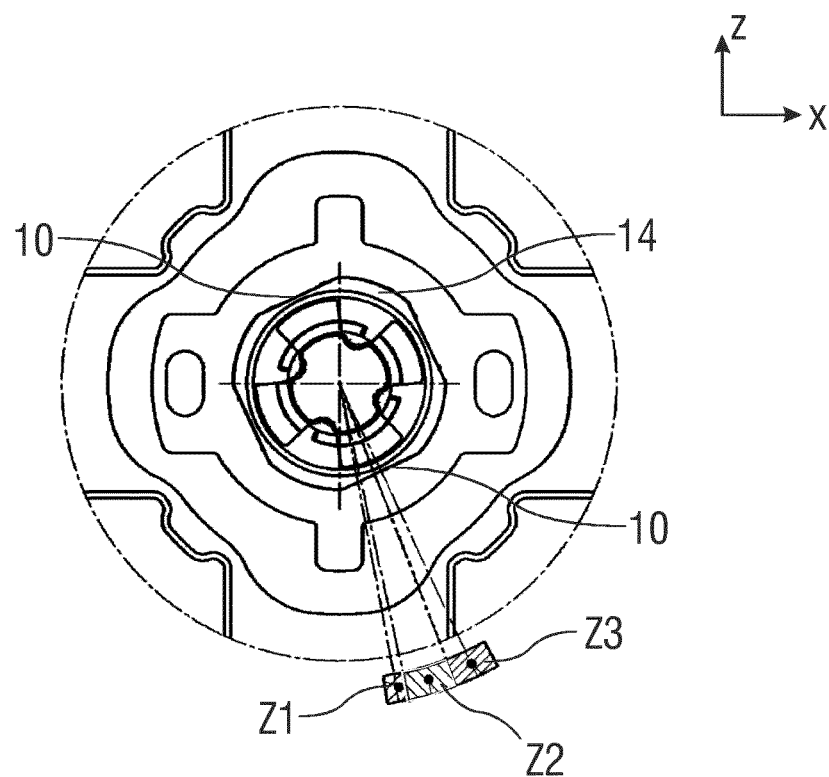
Figure 7C:
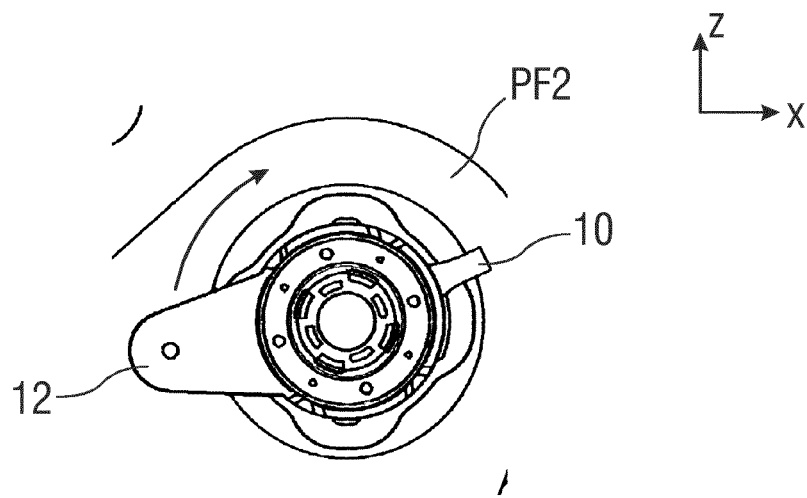

FIGS. 7A to 7C show an exploded view and side views of an embodiment of a pivot fitting PF with an optional flag element 10.

FIG. 7A shows a core flag concept, wherein the pivot fitting PF comprises an upper fitting member PF1 and a lower fitting member PF2. Further components of the pivot fitting PF can comprise a return spring 11, e.g. a tension spring, a pivotably mounted lever 12 interacting with a Bowden cable (not shown), and alternatively or additionally a handwheel 13. The handwheel 13 and/or the lever 12 may be adjusted on an outside of the seat 1 in order to facilitate manual adjustment of an inclination of the backrest 4 by the user U, whereby the Bowden cable enables movement of the backrest 4 with respect to the seat pan 3. The return spring 11 may be configured to bias the backrest 4 towards the use-position P1. The flag element 10 can comprise a signal color, such as red color, and is arranged on a driver cap 14 of the lever 12. The flag element 10 is trapped in place by the fitting member PF2, the lever 12 and/or the handwheel 13.

FIG. 7B shows the pivot fitting PF in a design position of the driver cap 14 showing different zones Z1 to Z3 of the driver cap 14, wherein zone Z1 is a full release zone of the pivot fitting PF, indicating a full release of the backrest 4, wherein zone Z2 is a flag zone and wherein zone Z3 is a lock zone of the pivot fitting PF, indicating a lock of the backrest 4. In flag zone Z2, the flag element 10 is tripped within this zone Z2, the user U can visually identify that the pivot fitting PF is partially open.

FIG. 7C shows another exemplary embodiment of the lever 12 being decoupled from the fitting member PF2 for manual operating adjustment, whereas the flag element 10 can be seen as separated flag.

The vehicle 2 may comprise one pivot fitting PF including the detection unit 6 as described above for each seat 1. That allows the user U to identify for all seats 1 reaching the non-use position P2 or not.

LIST OF REFERENCES 1 seat
2 vehicle
2.1 rear region
2.2 dashboard
3 seat pan
4 backrest
4.1 backrest frame
5 actuation element
6 detection unit
7, 7' indicator unit
8 electronic control unit
9 release lever
9.1 seat member, projection
10 flag element
11 return spring
12 lever
13 handwheel
14 driver cap
CR contact region
CS1, CS2 coupling structure
L indicator light
M motor
O obstacle
P1 use position
P2 non-use position
P3 intermediate position
PA pivot axis
PF pivot fitting
PF1, PF2 fitting member
Q query
S signal
S1, S2 switch
S2.1 contact member
S2.2 switch sensor
U user
Z1 to Z3 zone
x longitudinal axis
y transverse axis
z vertical axis

The invention claimed is:

1. A pivot fitting for a vehicle seat, for adjusting an inclination of the seat between at least a use position and at least a non-use position, the pivot fitting, comprising:
two fitting members configured to interact with each other, wherein one of the fitting members is fixed and the other fitting member is movable with respect to the fixed fitting member, and
at least one detection unit which is configured to determine if the seat is in at least one of the use position, an intermediate inclined position or the non-use position, wherein the at least one detection unit comprises at least two switches, wherein at least one switch is arranged in an upper section of the fixed fitting member to interact with the movable fitting member.

2. The pivot fitting according to claim 1, wherein the detection unit is configured to output a signal if the seat is in the intermediate position.

3. The pivot fitting according to claim 1, wherein the detection unit comprises a coupling structure configured to couple the detection unit to at least one indicator unit to indicate at least the intermediate position of the seat.

4. The pivot fitting according to claim 3, wherein the indicator unit is configured to indicate the position of the seat audibly and/or visually.

5. The pivot fitting according to claim 1, wherein the detection unit comprises a coupling structure to couple the detection unit to at least one of an electronic control unit.

6. The pivot fitting according to claim 1, wherein the detection unit is configured to determine a manual actuation of the inclination adjustment.

7. The pivot fitting according to claim 5, wherein the switches are configured to signal transmission to the electronic control unit upon activation, wherein the switches are activated when the seat is in the intermediate inclined position.

8. The pivot fitting according to claim 7, wherein
a first switch is configured to transmit a signal regarding the intermediate inclined position of the seat to the electronic control unit upon activation, and
a second electric switch is configured to verify if a release lever has changed states between locked and unlocked.

9. The pivot fitting according to claim 8, wherein the detection unit comprises at least one switch sensor coupled to at least one of the number of switches and configured to detect an activation of the switches.

10. The pivot fitting according to claim 9, wherein the at least one switch sensor is coupled to a switch contact member, wherein the switch sensor is configured to detect a contact of the switch contact member by a seat member when the seat is in the intermediate inclined position.

11. A vehicle seat, comprising:
a seat pan,
a backrest which is pivotably mounted to the seat pan, and
a pivot fitting for adjusting an inclination of the backrest relatively to the seat pan between at least a use position and at least a non-use position wherein said pivot member comprises
two fitting members configured to interact with each other, wherein one of the fitting members is fixed and the other fitting member is movable with respect to the fixed fitting member, and
at least one detection unit which is configured to determine if the seat is in at least one of the use position, an intermediate inclined position or the non-use position, wherein the at least one detection unit comprises at least two switches, wherein at least one switch is arranged in an upper section of the fixed fitting member to interact with the movable fitting member.

12. The seat according to claim 11, wherein at least one of the fitting members is coupled to an actuation element which is configured to electrically and/or mechanically actuate the inclination adjustment of the backrest.

13. The seat according to claim 11, wherein the pivot fitting is configured as an electric-powered continuously adjustable fitting.

14. The seat according to claim 13, wherein the pivot fitting is coupled to a motor for actuation of the inclination adjustment.

15. The pivot fitting according to claim 1, wherein when the movable fitting member moves from the use position to the non-use position the switch arranged on the upper section of the fitting member will be activated through a contact region of the movable fitting member.

16. A pivot fitting for a vehicle seat, for adjusting an inclination of the seat between at least a use position and at least a non-use position, the pivot fitting, comprising:
- at least one detection unit which is configured to determine if the seat is in at least one of the use position, an intermediate inclined position or the non-use position
- wherein the at least one switch sensor is coupled to a switch contact member, wherein the switch sensor is configured to detect a contact of the switch contact member by a seat member when the seat is in the intermediate inclined position.

* * * * *